Jan. 20, 1953 C. N. ACKER 2,625,747
MORTAR VENEER TEMPLATE
Filed March 6, 1947 5 Sheets-Sheet 1
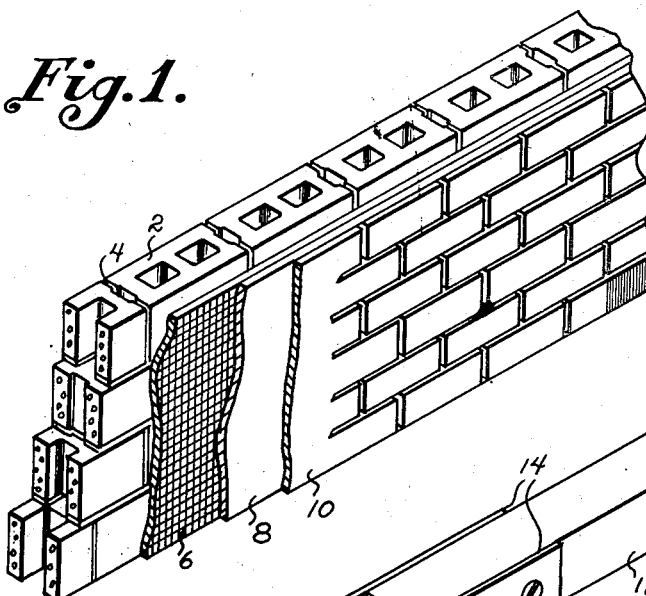
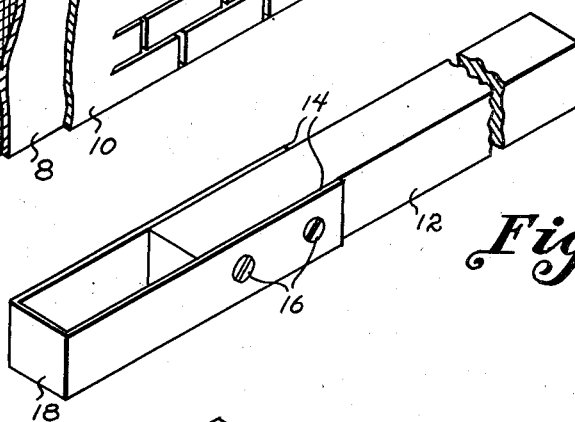
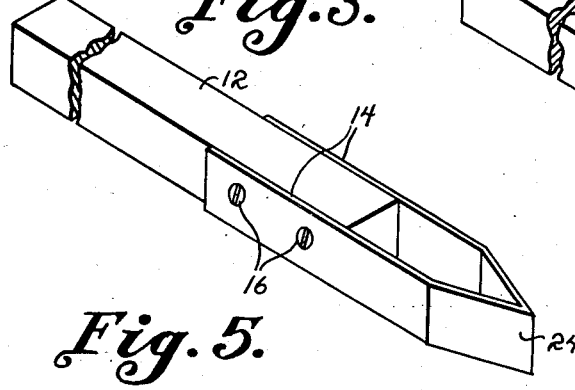
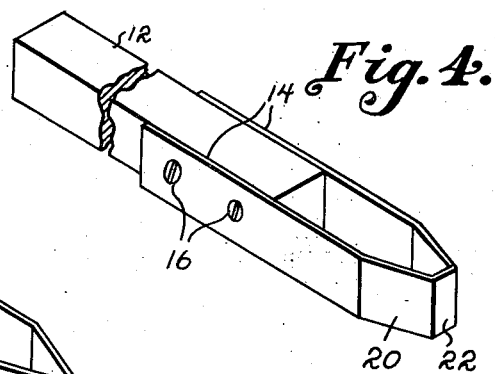
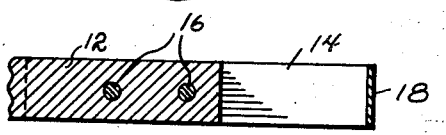
INVENTOR.
Carl N. Acker
BY Victor J. Evans & Co.
ATTORNEYS

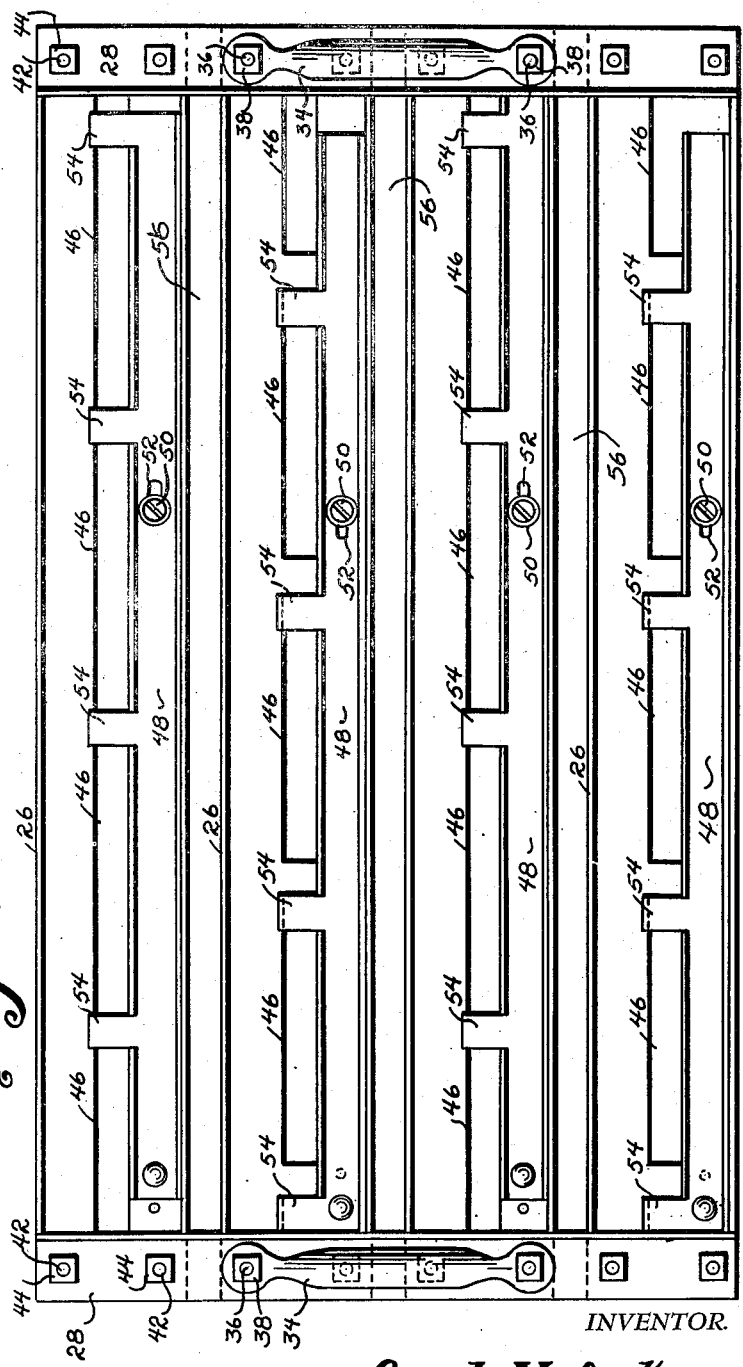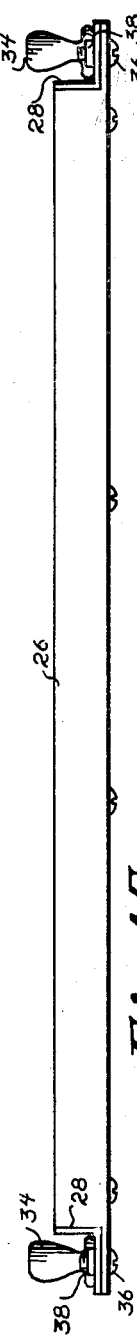

Jan. 20, 1953 — C. N. ACKER — 2,625,747
MORTAR VENEER TEMPLATE
Filed March 6, 1947 — 5 Sheets-Sheet 3
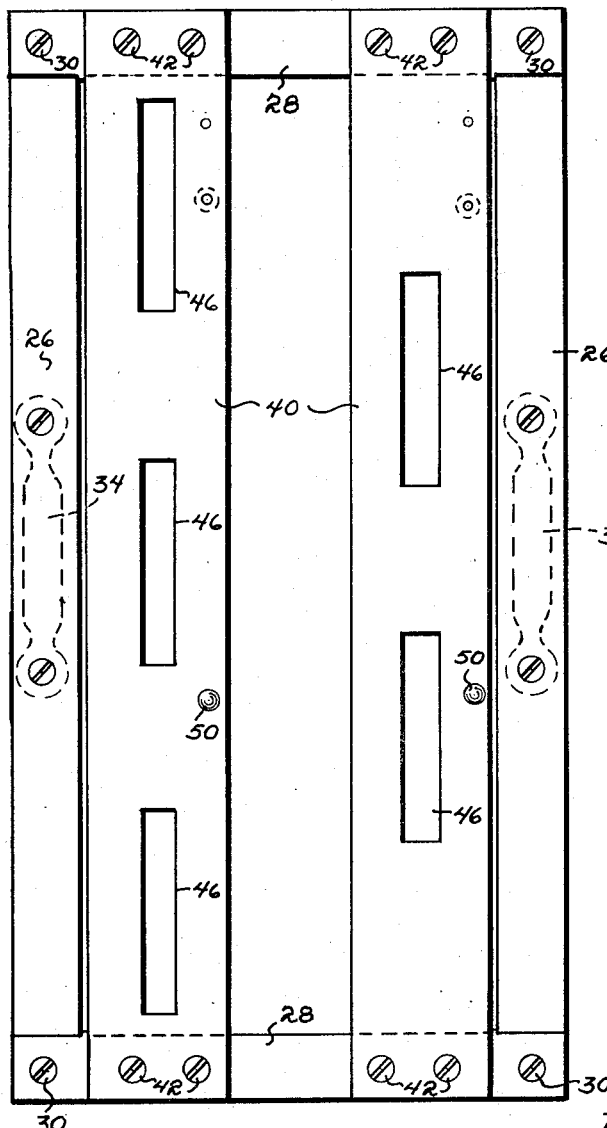
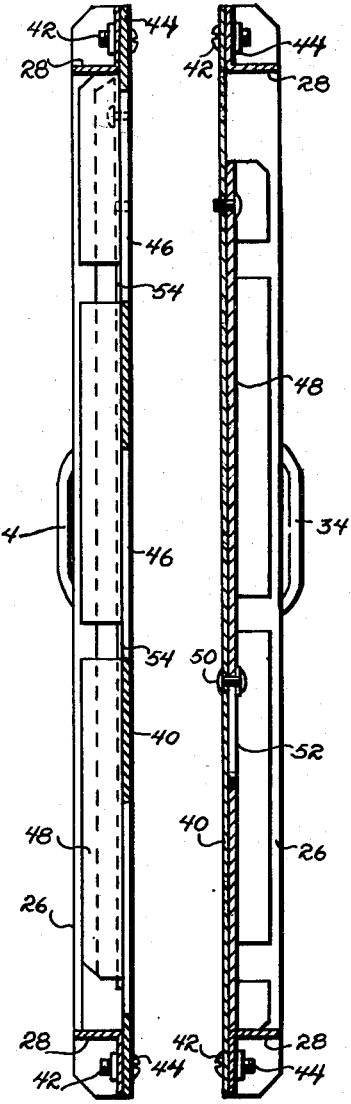
Fig.10.  Fig.11.  Fig.12.
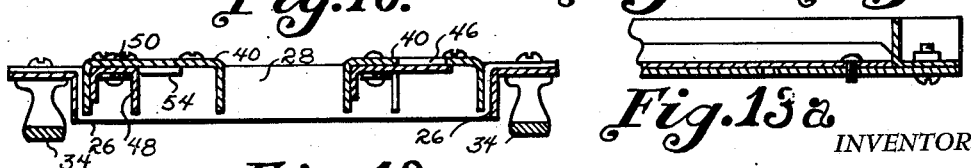
Fig.13.  Fig.13a.
INVENTOR.
Carl N. Acker
BY Victor J. Evans & Co.
ATTORNEYS Jan. 20, 1953 — C. N. ACKER — 2,625,747
MORTAR VENEER TEMPLATE
Filed March 6, 1947 — 5 Sheets-Sheet 2
Fig. 7. Fig. 6. Fig. 8.
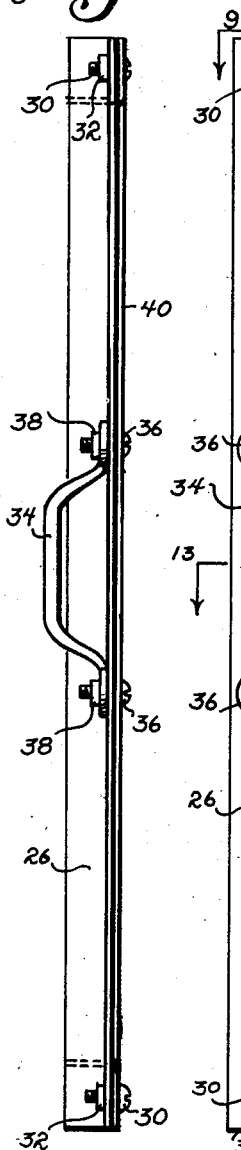
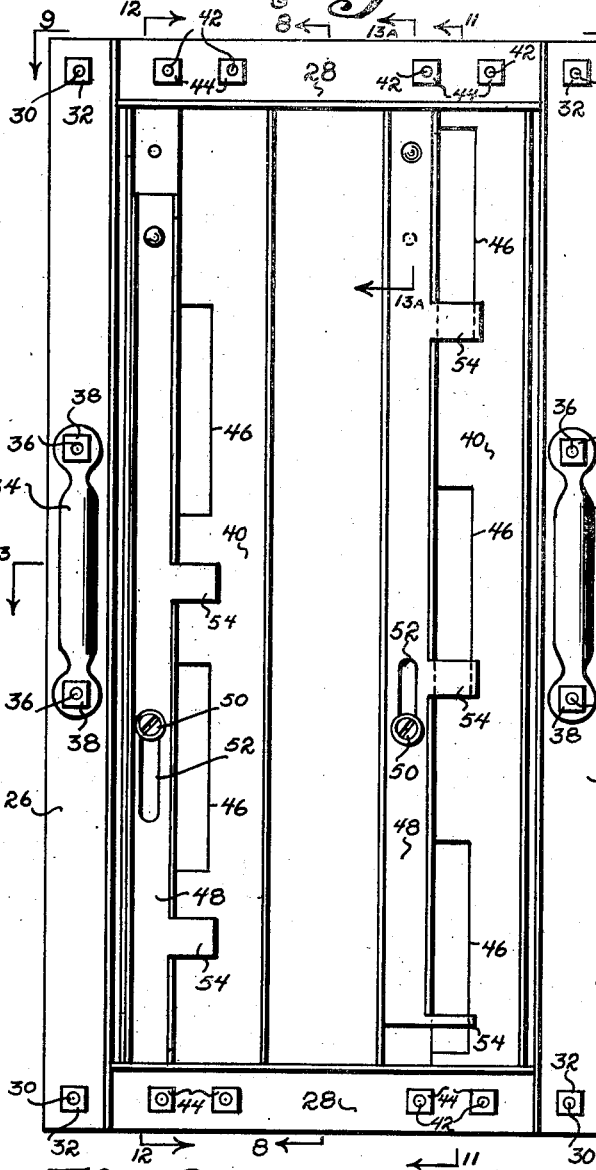
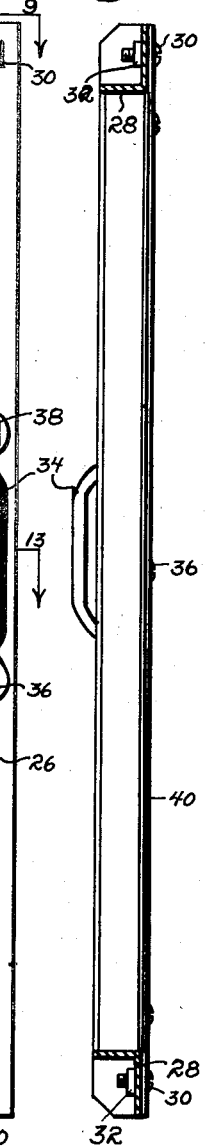
Fig. 9.
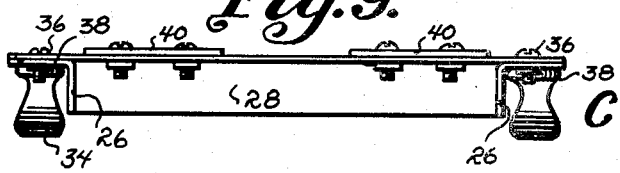
INVENTOR.
Carl N. Acker
BY Victor J. Evans & Co.
ATTORNEYS Jan. 20, 1953 C. N. ACKER 2,625,747
MORTAR VENEER TEMPLATE
Filed March 6, 1947 5 Sheets-Sheet 5
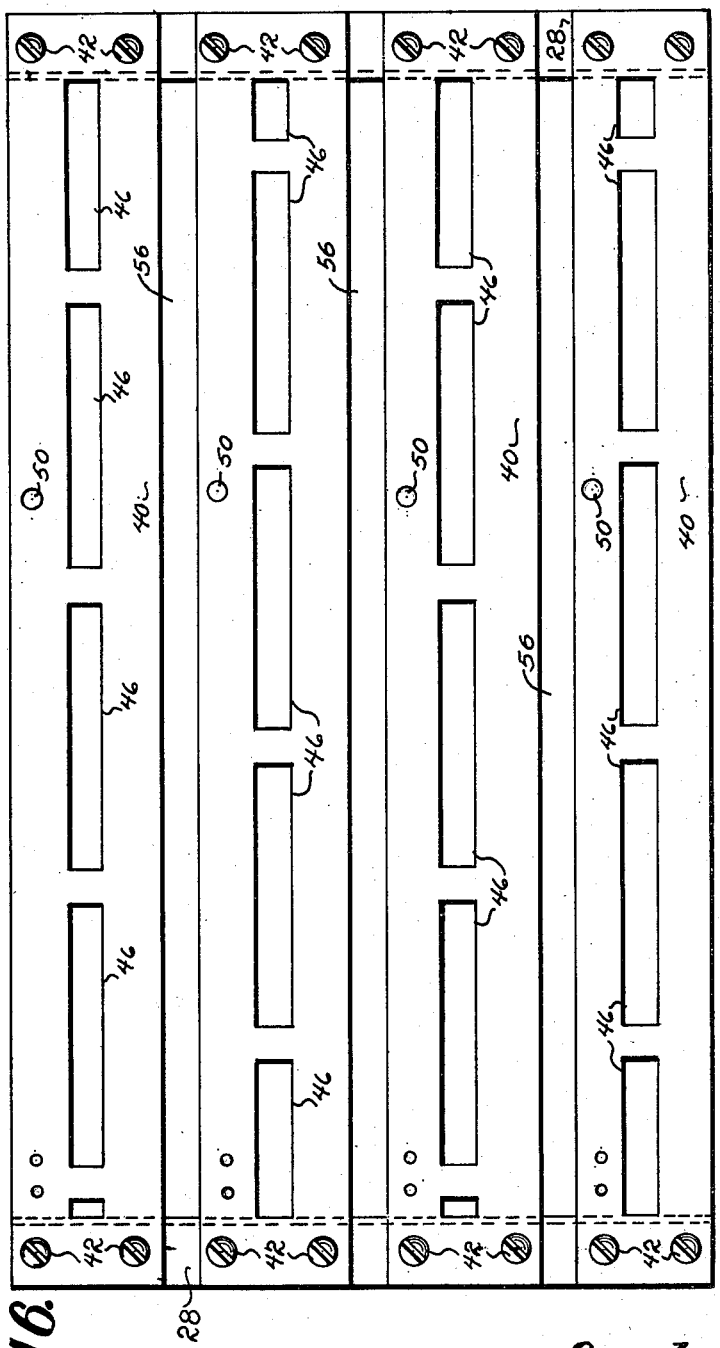
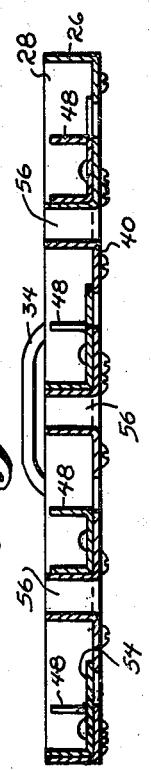
INVENTOR.
Carl N. Acker
BY Victor J. Evans & Co.
ATTORNEYS Patented Jan. 20, 1953

2,625,747

UNITED STATES PATENT OFFICE 2,625,747

MORTAR VENEER TEMPLATE

Carl N. Acker, Midland, Tex.

Application March 6, 1947, Serial No. 732,833

1 Claim. (Cl. 33—174)

My present invention relates to an improved mortar veneer template and the cut out tools used therewith to ornament mortar veneer coating on building walls to simulate brick or stone finish.

According to my invention the building wall which may be of cinder block, concrete block or other suitable construction, is laid and covered with undercoats and finish coats of suitable mortar. The templates are then laid against the mortar coat and with proper tools hereinafter described the cut out portions of the templates guide the tools to remove strips of mortar to form grooves therein simulating the recesses of a stone or brick wall.

By the use of my invention walls may be constructed of lower cost materials of the proper strength and these walls may be finished to present the appearance of high cost walls. The templates are adjustable to provide variations in the grooves or recesses to be formed and are easily handled and moved from one wall section to another.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a perspective view of a wall showing the various mortar coats and the finished coat.

Figs. 2, 3 and 4 are perspective views of the cut out tools.

Fig. 5 is a sectional view of a tool.

Fig. 6 is a top plan view of a template.

Fig. 7 is a side elevational view thereof.

Fig. 8 is a longitudinal sectional view at line 8—8 of Fig. 6.

Fig. 9 is an end elevational view.

Fig. 10 is a bottom plan view.

Figs. 11, 12, and 13 are sectional views at the indicated lines of Fig. 6.

Fig. 13a is a detail view of the template assembly.

Fig. 14 is a side elevational view of a modified template.

Fig. 15 is a top plan view thereof.

Fig. 16 is a bottom plan view.

Fig. 17 is a transverse sectional view at line 17—17 of Fig. 16.

Referring now to the drawings wherein I have illustrated the present preferred embodiment of my invention, I utilize a wall as seen in Figure 1 comprising the tier of blocks 2 secured by mortar joints 4 and covered with a scratch coat 6, a brown coat 8 and a finish coat 10.

After the finish coat is properly applied, the templates are positioned and the tools having handles 12 and metal cutters are employed. These cutters normally consist in spaced parallel metal plates 14 secured by screws 16, the ends of which plates may be connected by a flat strip 18, angular sections 20 with a flat section 22, or angular sections 24.

The templates comprise the angle frame sides 26 with end members 28 secured by bolts 30 and nuts 32, and handles 34 are secured to the sides by bolts 36 and nuts 38. Guide strips 40 are secured to the ends by bolts 42 and nuts 44 and formed with slots 46 through which the cutting tools are moved to remove a portion of the mortar to create the grooves or recesses therein.

Movable plates 48 adjustably secured to the guide strips by screws 50 in slots 52 have lugs 54 designed to lap a portion of the slots 46 to reduce the size of the slots. The lugs 54 prevent the cutters from breaking into the top or bottom of the adjoining horizontal simulated brick at the top or bottom of the vertical mortar joint. When the vertical template, see Fig. 6, is placed against the wall, all the lugs 54 are moved to cover up the horizontal mortar joint. Then when the cutters are moved downwardly from the top of the slots 46, for the vertical mortar cuts, the cutters move over the lugs 54 and keep the cutters from breaking into the top of the adjoining horizontal simulated brick at the bottom of the vertical mortar joint. If the lugs 54 were not in position the cutters would pass through the entire length of the slots 46 and break into the tops of the adjoining horizontal simulated bricks. Then the lugs are moved in the opposite directions, and the cutter is moved upwardly from the bottom of the slots 46 over the lugs to complete all vertical cuts.

The template of Figs. 6 through 13 is arranged to be located vertically of the wall to be scored and the template of Figs. 14 through 17 is designed for horizontal use. In this instance, however, the slots 56 formed by the outer edges of the frame sides 26 in their spaced relation to each other are used to remove a portion of the mortar to create horizontal grooves or recesses therein, in contrast to the grooves 46 used to create the vertical grooves or recesses.

The method used by applicant to ornament the finish coat that has been applied to a wall of suitable construction comprises the use of two forms of template. The form shown in Figs. 14 and 16 for horizontal mortar cuts and the form shown in Figs. 6 to 12a for vertical mortar cuts.

After a wall consisting for example of blocks 2 has been erected and coats 6, 8 and 10 have been applied to the blocks 2 the forms previously described are placed on the coating 10.

The horizontal mortar cuts are made first and therefore the form disclosed in Figs. 14 to 17 are placed on the face of the coating first.

Thus with the mortar in place and in proper working condition the templates are used as described to provide guides for vertical and horizontal scoring to produce grooves simulating mortar recesses between blocks or stones.

With the templates and tools of my invention, neat and ornamental surfaces may be applied to plain walls with uniformity and ease, and the speed of operation is increased by the movement of the templates from place to place on the wall as each section is completed.

Having thus fully described my invention what I claim as new and desire to secure by Letters Patent is:

A mortar scoring template that is adapted to be applied to a coating of mortar on a wall before the setting of the mortar for the scoring thereof, comprising a frame including angle end pieces having angle side pieces detachably connected thereto at the opposite ends thereof, guide strips detachably secured at their ends to said end pieces in spaced relation to each other, the outer longitudinal edge of said guide strips engaging the side pieces and angle pieces similar to the side pieces engaging the other edges of the guide strips to outline longitudinal extending spaces therebetween that are adapted to receive cutters therein to score the mortar coating, each guide piece having longitudinally spaced slots and the slots in alternate guide pieces positioned in said guide strips in offset relation to each other, and a plate having outstanding lugs thereon mounted on each guide strip for sliding movement thereon so that the lugs overlie said slots to vary the length of said slots when said plate is slid longitudinally of said guide strip for the insertion in said slots of a cutter for the scoring of horizontal and vertical mortar lines in the coating of mortar.

CARL N. ACKER.

REFERENCES CITED

The following references are of record in the file of this patent:

UNITED STATES PATENTS

| Number | Name | Date |
|---|---|---|
| 370,215 | Staples | Sept. 20, 1887 |
| 637,373 | Crawford | Nov. 21, 1899 |
| 807,817 | Gilbert | Dec. 19, 1905 |
| 1,564,578 | Kennedy | Dec. 8, 1925 |
| 1,594,775 | Greslen | Aug. 3, 1926 |
| 2,115,142 | Ezell | Apr. 26, 1938 |
| 2,162,861 | Polak | June 20, 1939 |

FOREIGN PATENTS

| Number | Country | Date |
|---|---|---|
| 5,821 | England | Mar. 16, 1908 |